US010959272B1

(12) United States Patent
Ramachandra et al.

(10) Patent No.: US 10,959,272 B1
(45) Date of Patent: Mar. 23, 2021

(54) METHODS PROVIDING PRIMARY IDENTIFICATIONS OF BASE STATIONS AND RELATED WIRELESS TERMINALS AND BASE STATIONS

(71) Applicant: Telefonaktiebolaget LM Ericsson (publ), Stockholm (SE)

(72) Inventors: Pradeepa Ramachandra, Linköping (SE); Mehdi Amirijoo, Linköping (SE); Icaro L. J. da Silva, Solna (SE); Fredrik Gunnarsson, Linköping (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 16/498,753

(22) PCT Filed: Feb. 28, 2018

(86) PCT No.: PCT/SE2018/050188
§ 371 (c)(1),
(2) Date: Sep. 27, 2019

(87) PCT Pub. No.: WO2018/186783
PCT Pub. Date: Oct. 11, 2018

Related U.S. Application Data

(60) Provisional application No. 62/482,127, filed on Apr. 5, 2017.

(51) Int. Cl.
*H04W 74/08* (2009.01)
*H04W 74/00* (2009.01)
(Continued)

(52) U.S. Cl.
CPC ....... *H04W 74/0833* (2013.01); *H04W 24/02* (2013.01); *H04W 36/0083* (2013.01);
(Continued)

(58) Field of Classification Search
CPC ........... H04W 74/0833; H04W 74/006; H04W 24/02; H04W 36/0083; H04W 72/042; H04W 72/1284; H04W 72/006
(Continued)

(56) References Cited

U.S. PATENT DOCUMENTS

| 2014/0004850 A1* | 1/2014 | Kwon | H04W 68/02 455/423 |
| 2016/0029253 A1* | 1/2016 | Sarkar | H04W 36/0016 455/436 |

FOREIGN PATENT DOCUMENTS

| EP | 2398277 A1 | 12/2011 |
| WO | WO 2013/095219 A1 | 6/2013 |

(Continued)

OTHER PUBLICATIONS

International Search Report and Written Opinion of the International Searching Authority, PCT/SE2018/050188, dated Jun. 21, 2018, 11 pages.
(Continued)

*Primary Examiner* — Peter G Solinsky
(74) *Attorney, Agent, or Firm* — Sage Patent Group

(57) ABSTRACT

Methods may be provided to operate a wireless terminal UE in a wireless communication network. Responsive to receiving a request for a primary identification of a non-serving base station for the wireless terminal, transmission to the non-serving base station for the wireless terminal may be initiated using a random access channel RACH configuration. A random access response RAR may be received from the non-serving base station. Moreover, the random access response may be received with the primary identification of the non-serving base station, and the random access response may be responsive to the transmission using the RACH configuration. The primary identification of the non-
(Continued)

serving base station may be transmitted to a node of the wireless communication network other than the non-serving base station.

20 Claims, 14 Drawing Sheets

(51) Int. Cl.
    *H04W 36/00*     (2009.01)
    *H04W 72/12*     (2009.01)
    *H04W 24/02*     (2009.01)
    *H04W 72/04*     (2009.01)

(52) U.S. Cl.
    CPC ..... *H04W 72/042* (2013.01); *H04W 72/1284* (2013.01); *H04W 74/006* (2013.01)

(58) Field of Classification Search
    USPC .......................................................... 370/329
    See application file for complete search history.

(56) References Cited

FOREIGN PATENT DOCUMENTS

| | | |
|---|---|---|
| WO | WO 2013/127424 A1 | 9/2013 |
| WO | WO 2018/067048 A1 | 4/2018 |
| WO | WO 2018/080357 A1 | 5/2018 |

OTHER PUBLICATIONS

3GPP TSG-RAN WG2#98; R2-1704108; Hangzou, P.R. of China, May 15-19, 2017; Ericsson; ANR for NASA NR; Published: May 6, 2017, pp. 1-5.

European Search Report for European Patent Application No. EP 18780506.4 dated Feb. 27, 2020, 4 pages.

\* cited by examiner

Random Access Resource Periodicity

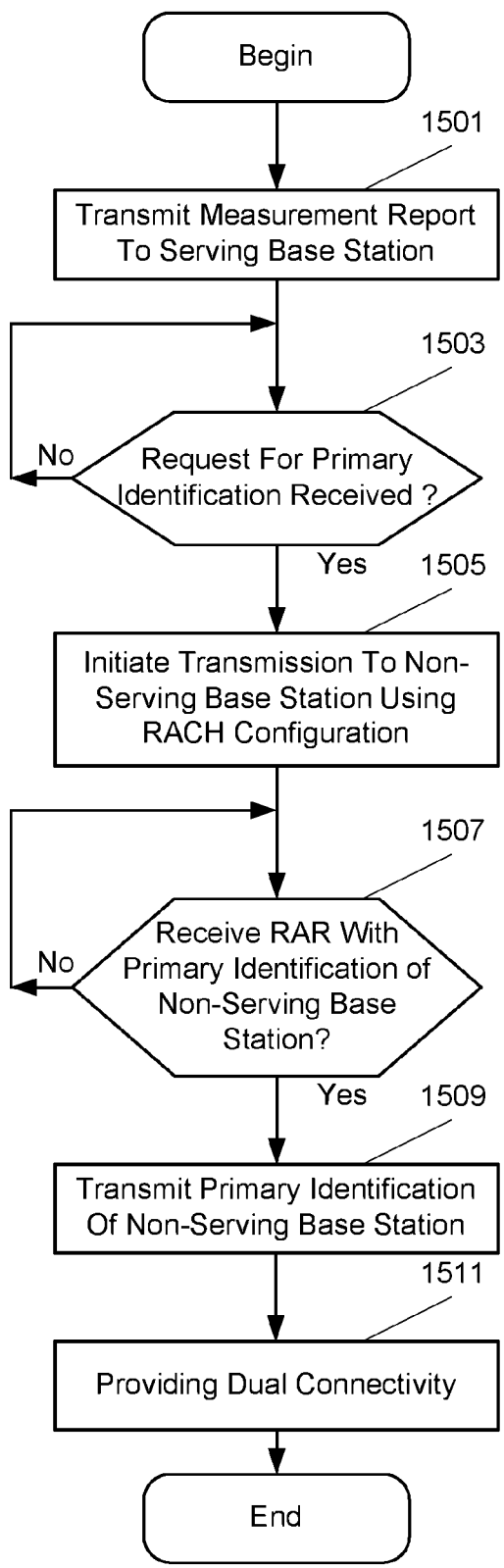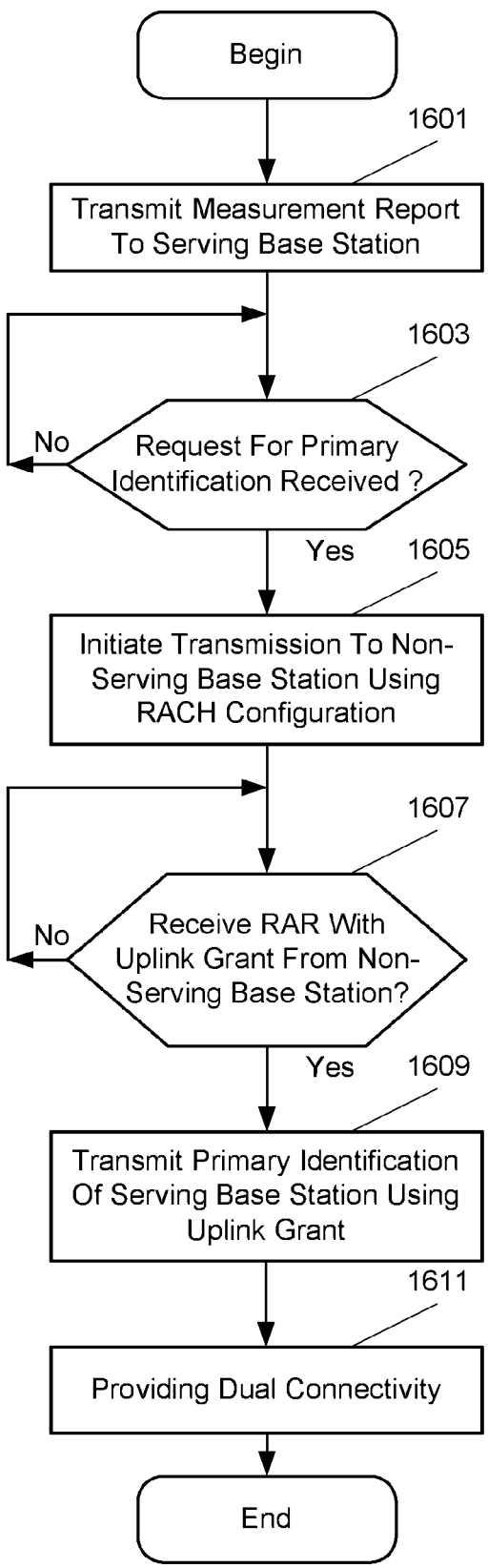

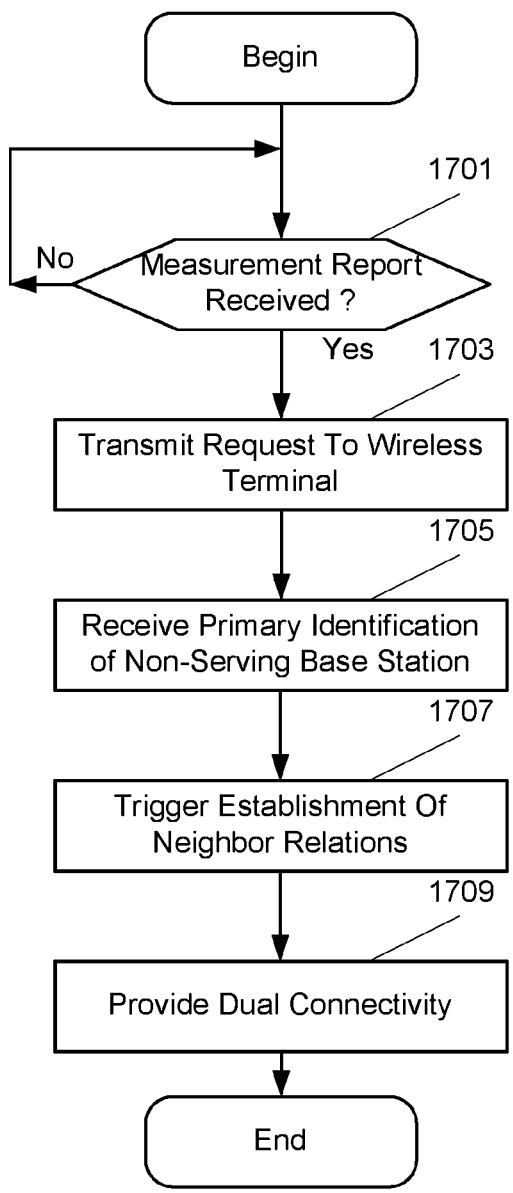
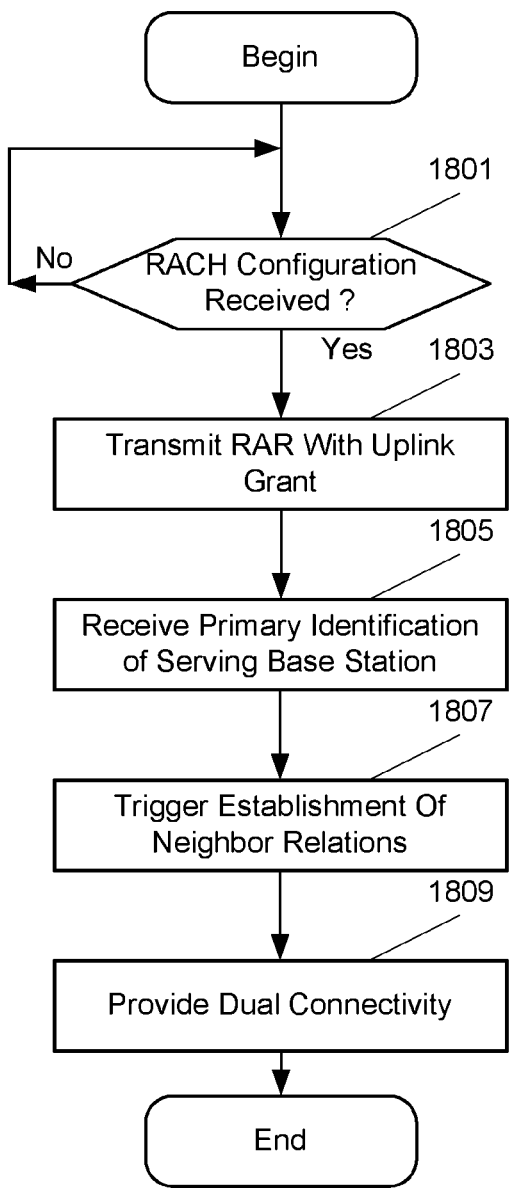

US 10,959,272 B1

METHODS PROVIDING PRIMARY IDENTIFICATIONS OF BASE STATIONS AND RELATED WIRELESS TERMINALS AND BASE STATIONS

This application is a 35 U.S.C. § 371 national stage application of PCT International Application No. PCT/SE2018/050188 filed on Feb. 28, 2018, which in turns claims domestic priority to U.S. Provisional Patent Application No. 62/482,127, filed on Apr. 5, 2017, the disclosures and content of which are incorporated by reference herein in their entirety.

TECHNICAL FIELD

The present disclosure relates generally to communications, and more particularly, to wireless communications and related methods, wireless terminals, and network nodes.

BACKGROUND

This disclosure relates to recent technology trends that are of interest in a 5G context. This disclosure may also be applicable in further development of the existing mobile broadband systems such as WCDMA and LTE. Some relevant technology trends are briefly discussed in this section.

A design principle currently under consideration for NR (New Radio) is to base it on an ultra-lean design. This may imply that "always on signals" from the network should be reduced/avoided as much as possible. Possible benefits from this design principle may include significantly lower network energy consumption, better scalability, a higher degree of forward compatibility during the RAT evolution phase, lower interference from system overhead signals and consequently higher throughput in low load scenario, and/or improved support for user centric beam-forming.

In case of operating NR in non-standalone mode, supported by LTE (Long Term Evolution), then the NR (New Radio) nodes are not transmitting system information, neither to provide the global cell identifier (ECGI in LTE) nor the random access parameters for the NR nodes. FIG. 1 illustrates a non-standalone configuration with a UE 10, LTE Master eNBs 20, and NR gNBs 30. The UE 10 is served by a LE MeNB 20 and can at the same time be connected to one or more NR gNBs 30.

Beam-formed transmission of synchronization and a physical cell identifier (PCI) may be used.

In New Radio (NR), a Synchronization Signal (SS) block may include at least two time-division multiplexed components: Primary Synchronization Signal (PSS) and Secondary Synchronization Signal (SSS). SSS can be used for downlink based Radio Resource Management (RRM) measurement for Layer 3 mobility.

The PSS+SSS are transmitted together with a broadcast channel denoted PBCH, which carries a small part of the system information, sometimes referred to as the Master Information Block (MIB). The PSS+SSS+PBCH structure is denoted SS Block.

The SS Block is broadcast in a cell to provide crucial information for UEs, and is also considered to be transmitted by gNBs in non-standalone mode.

An example of SS block configuration is provided in FIG. 2, where each SS block in an SS block burst set is associated to a beam.

Connected mode mobility will now be discussed.

Mobility is supported by measurements of alternative beams at neighboring NR nodes. When the measurements meet a configured criterion (e.g. neighbor beam/cell becomes better than currently serving), the UE will send a measurement report to the serving LTE MeNB, which can use the information to decide to add, replace, remove the connectivity to an NR gNB. The LTE MeNB may use the reported PCI to identify the target NR gNB, which requires that the MeNB is configured with a mapping between the PCI and the unique gNB ID, or the transport network layer (TNL) address information to the gNB. The TNL address information can be retrieved using the unique gNB ID. In the following, the unique gNB ID will be denoted Global Node ID, GNID. The association procedure to establish a relation between a non-unique PCI and a unique gNB ID is commonly denoted Automatic Neighbor Relations (ANR).

In LTE, ANR was based on UEs upon request detecting and reporting the unique evolved cell global ID, ECGI, which is broadcasted as part of the system information.

The random access procedure in a mobile communication system (such as LTE) in case of initial access is outlined below with respect to FIG. 3:

- Step 1 includes transmission of a random access preamble, allowing the receiving node to estimate the transmission timing of the UE. Uplink synchronization is necessary as the UE otherwise cannot transmit any uplink data.
- Step 2 includes the network transmitting a timing advance command to correct the uplink timing, based on the timing of arrival measurement in the first step. In addition to establishing uplink synchronization, the second step also assign a temporary identifier to the UE, and temporary identifier of the node, to be used in the third step in the random access procedure. In NX is it envisioned that several nodes may reply to the Random Access Preambles sent by the UE in step 1.
- Step 3 includes signaling from the UE to the network in order to setup connection. A primary function of this message is to uniquely identify the UE. The exact content of this signaling depends on the state of the UE, e.g., whether it is previously known to the network or not.
- Step 4, the final phase, is responsible for contention resolution in case multiple UEs tried to access the system on the same resource.

The random access resource in a beam based system may need to be associated to a beam based random access reception, where the beam forming gains of the synchronization signal transmission and the random access reception may need to be aligned and matching. One typical configuration is illustrated by FIG. 4 with the random access resources defined by offsets in time and/or frequency in relation to the SS block, or NR synch signal in general (NR-SS). The random access resource can be separated into one or several resources.

Overhead for current ANR procedures, however, may be inefficient, and/or current ANR procedures may be unsuitable for non-standalone cases.

SUMMARY

According to some embodiments of inventive concepts, methods may be provided to operate a wireless terminal UE in a wireless communication network. Responsive to receiving a request for a primary identification of a non-serving base station for the wireless terminal, transmission to the non-serving base station for the wireless terminal may be initiated using a random access channel RACH configuration. A random access response RAR may be received from the non-serving base station. Moreover, the random access response may be received with the primary identification of the non-serving base station, and the random access response may be responsive to the transmission using the RACH configuration. The primary identification of the non-serving base station may be transmitted to a node of the wireless communication network other than the non-serving base station.

According to some other embodiments of inventive concepts, methods may be provided to operate a wireless terminal UE in a wireless communication network. Responsive to receiving a request for a primary identification of a non-serving base station for the wireless terminal, transmission to the non-serving base station for the wireless terminal may be initiated using a random access channel RACH configuration. A random access response RAR may be received with an uplink grant from the non-serving base station, where the random access response is responsive to the transmission using the RACH configuration. A primary identification of a serving base station for the wireless terminal may be transmitted to the non-serving base station using the uplink grant.

According to still other embodiments of inventive concepts, methods may be provided to operate a base station in a wireless communication network, where the base station acts as a serving base station for a wireless terminal. A measurement report may be received from a wireless terminal, with the measurement report including a secondary identification of a non-serving base station. Responsive to the measurement report, a request may be transmitted to the wireless terminal for a primary identification of the non-serving base station. After transmitting the request, the primary identification of the non-serving base station may be received from the wireless terminal.

According to yet further embodiments of inventive concepts, methods may be provided to operate a base station in a wireless communication network, where the base station is a non-serving base station with respect to a wireless terminal. A random access channel RACH configuration may be received from a wireless terminal. Responsive to receiving the RACH configuration from the wireless terminal, a random access response RAR may be transmitted with an uplink grant to the wireless terminal. A primary identification of a serving base station may be received from the wireless terminal using the uplink grant.

According to some embodiments of inventive concepts, Automatic Neighbor Relations may be supported in New Radio in a non-standalone mode where NR nodes may provide relatively limited system information. Activation of Automatic Neighbor Relations overhead may thus be reduced, for example, to when a neighbor relation is to be established.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 15 and 16 are flow charts illustrating wireless terminal UE operations according to some embodiments of inventive concepts; and FIGS. 17 and 18 are flow charts illustrating network node operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 13:
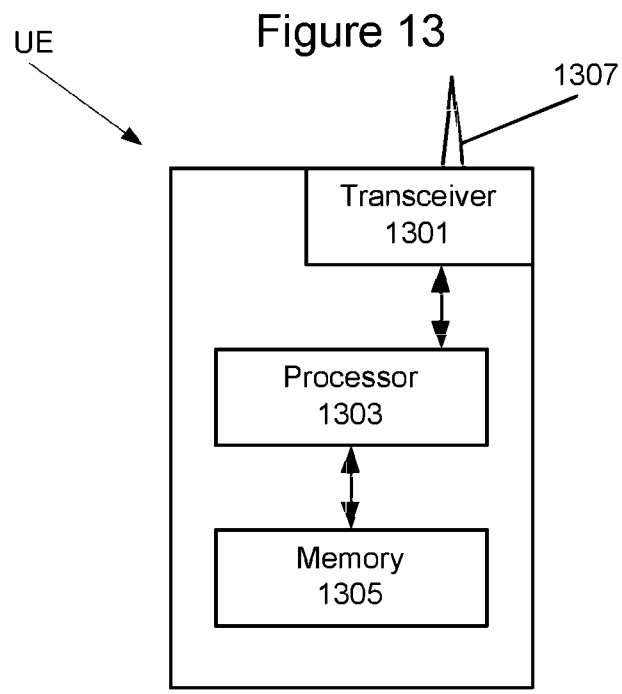
FIG. 13 is a block diagram illustrating elements of a wireless terminal UE according to some embodiments of inventive concepts.

FIG. 13 is a block diagram illustrating elements of a wireless terminal UE (also referred to as a wireless device, a wireless communication device, a wireless communication terminal, user equipment, a user equipment node/terminal/device, etc.) configured to provide wireless communication according to embodiments of inventive concepts. As shown, wireless terminal UE may include an antenna 1307, and a transceiver circuit 1301 (also referred to as a transceiver) including a transmitter and a receiver configured to provide uplink and downlink radio communications with a base station of a radio access network. Wireless terminal UE may also include a processor circuit 1303 (also referred to as a processor) coupled to the transceiver circuit, and a memory circuit 1305 (also referred to as memory) coupled to the processor circuit. The memory circuit 1305 may include computer readable program code that when executed by the processor circuit 1303 causes the processor circuit to perform operations according to embodiments disclosed herein. According to other embodiments, processor circuit 1303 may be defined to include memory so that a separate memory circuit is not required. Wireless terminal UE may also include an interface (such as a user interface) coupled with processor 1303.

As discussed herein, operations of wireless terminal UE may be performed by processor 1303 and/or transceiver 1301. For example, processor 1303 may control transceiver 1301 to transmit communications through transceiver 1301 over a radio interface to a base station and/or to receive communications through transceiver 1301 from a base station over a radio interface.

Moreover, modules may be stored in memory 1305, and these modules may provide instructions so that when instructions of a module are executed by processor 1303, processor 1303 performs respective operations (e.g., operations discussed below with respect to Example Embodiments).

Figure 14:
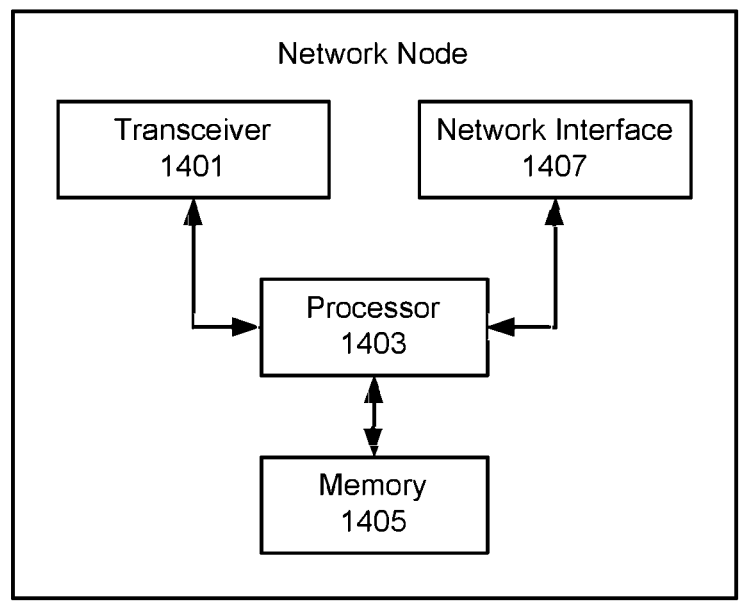
FIG. 14 is a block diagram illustrating elements of a network node according to some embodiments of inventive concepts.

FIG. 14 is a block diagram illustrating elements of a node (also referred to as a network node, base station, eNB, eNodeB, gNB, MeNB, etc.) of a Radio Access Network (RAN) configured to provide cellular communication according to embodiments of inventive concepts. As shown, the network node may include a transceiver circuit 1401 (also referred to as a transceiver) including a transmitter and a receiver configured to provide uplink and downlink radio communications with wireless terminals. The network node may include a network interface circuit 1407 (also referred to as a network interface) configured to provide communications with other nodes (e.g., with other base stations) of the RAN. The network node may also include a processor circuit 1403 (also referred to as a processor) coupled to the transceiver circuit, and a memory circuit 1405 (also referred to as memory) coupled to the processor circuit. The memory circuit 1405 may include computer readable program code that when executed by the processor circuit 1403 causes the processor circuit to perform operations according to embodiments disclosed herein. According to other embodiments, processor circuit 1403 may be defined to include memory so that a separate memory circuit is not required.

As discussed herein, operations of the network node may be performed by processor 1403, network interface 1407, and/or transceiver 1401. For example, processor 1403 may control transceiver 1401 to transmit communications through transceiver 1401 over a radio interface to one or more UEs and/or to receive communications through transceiver 1401 from one or more UEs over a radio interface. Similarly, processor 1403 may control network interface 1407 to transmit communications through network interface 1407 to one or more other network nodes and/or to receive communications through network interface from one or more other network nodes. Moreover, modules may be stored in memory 1405, and these modules may provide instructions so that when instructions of a module are executed by processor 1403, processor 1403 performs respective operations (e.g., operations discussed below with respect to Example Embodiments).

An alternative to LTE ANR is to establish a radio connection via random access to the non-serving cell and either obtain the GNID via dedicated signaling (see, International Application No. PCT/SE2016/050959, also referred to as Reference [1]; or International Application No. PCT/SE2016/051043, also referred to as Reference [2]) or let the UE send the source gNB GNID to the target gNB (see, International Publication No. WO 2013/095219, also referred to as Reference [3]).

The LTE solution for establishing neighbor base station relation establishment is based on the always-on reference signals in LTE and broadcasting of unique GNIDs. In non-standalone NR, the gNBs do not broadcast the GNIDs. Also, neither is the random access configuration provided via system information from the gNB. Therefore, previous solutions to access the target cell to either obtain the target GNID or provide source GNID may not work in the non-standalone case.

According to some embodiments of inventive concepts, there are parts of the random access procedure that are common for all nodes in a region or network. Thereby, the UE can be configured to initiate the random access procedure. However, the random access resources may not be fully known, for example, due to the beam sweeping, where the random access resources are configured cell-specifically in relation to the SS blocks. Therefore, the UE is configured to initiate transmission of repetitive random access preambles in order to trigger a random access response. Also, the UE can be configured to send a next random access preamble before the time of the resource for the random access response.

Figure 1:
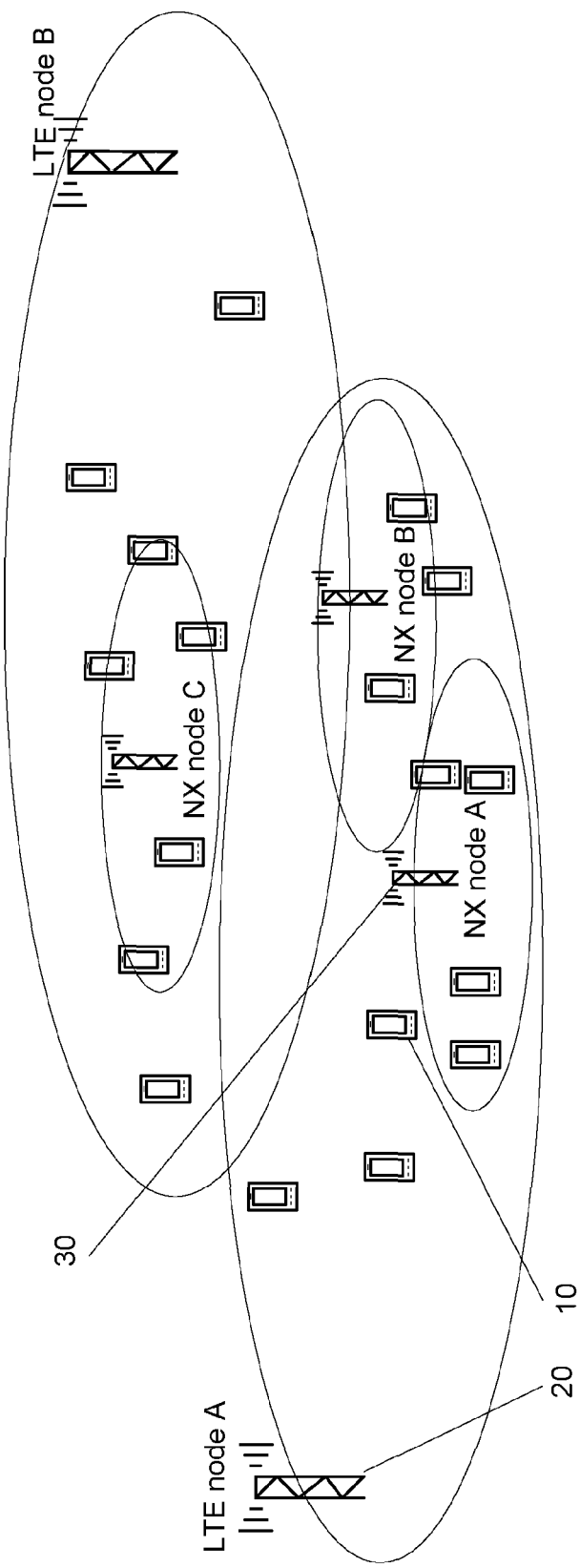
FIG. 1 is a schematic diagram illustrating an example of a network configuration.
Figure 2:
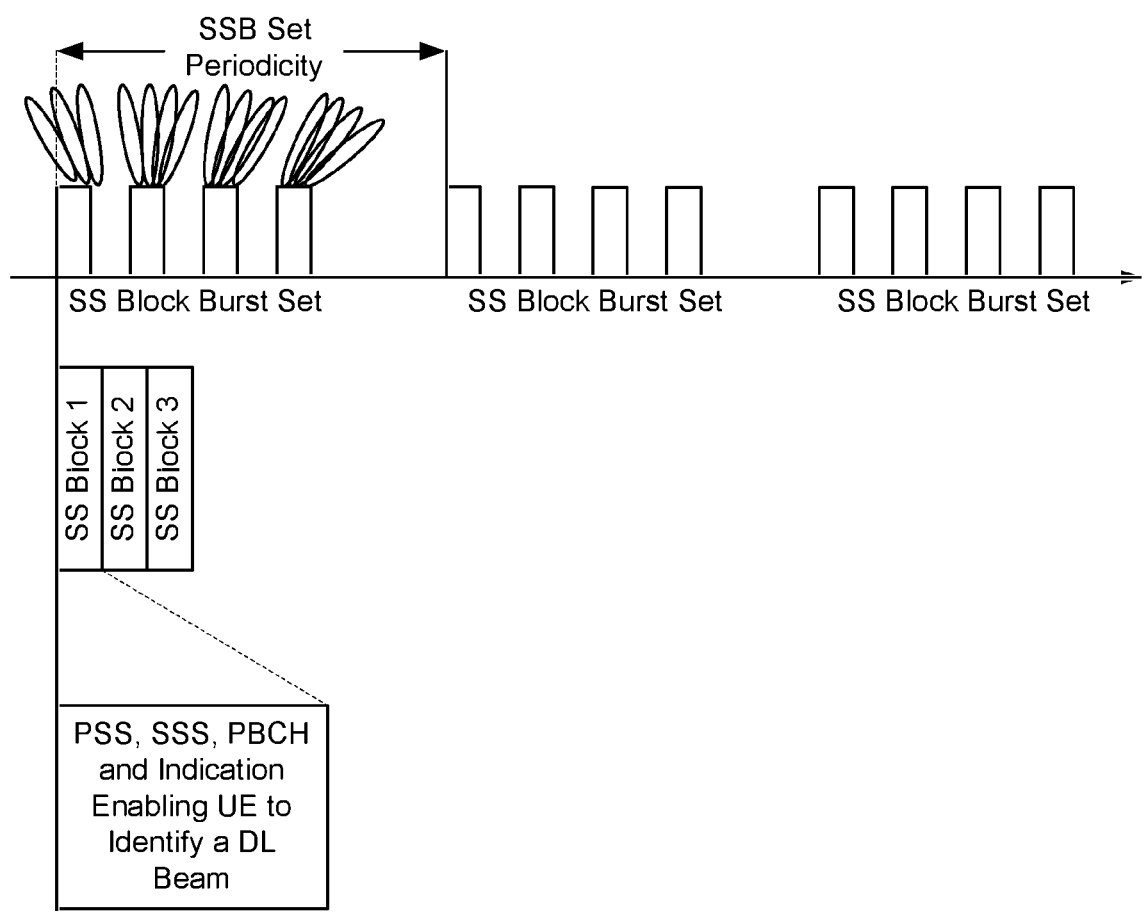
FIG. 2 is a diagram illustrating an SS block configuration where SS blocks are combined into SS block bursts and SS block burst sets.
Figure 3:
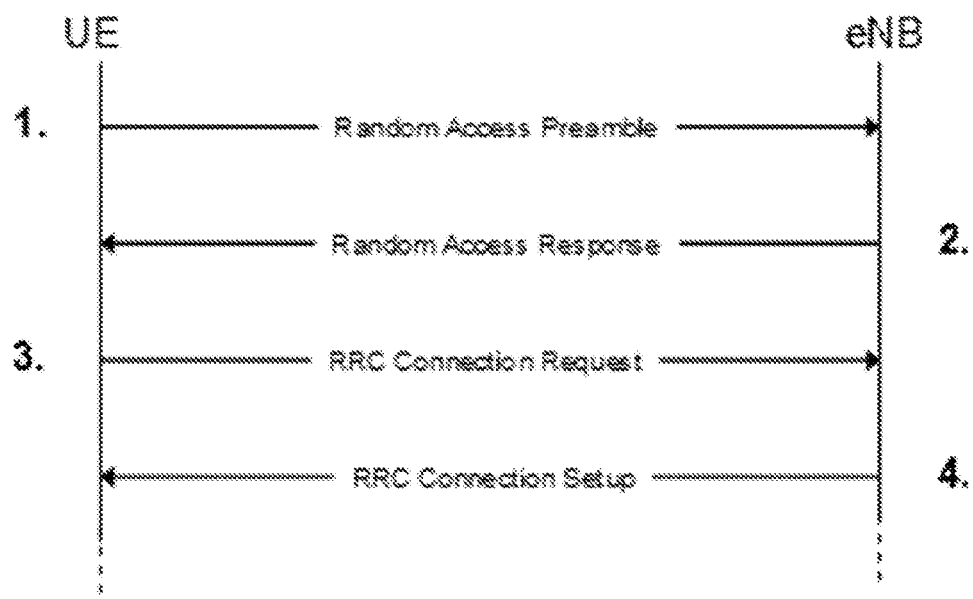
FIG. 3 is message diagram illustrating a random access procedure in case of initial access.
Figure 4:
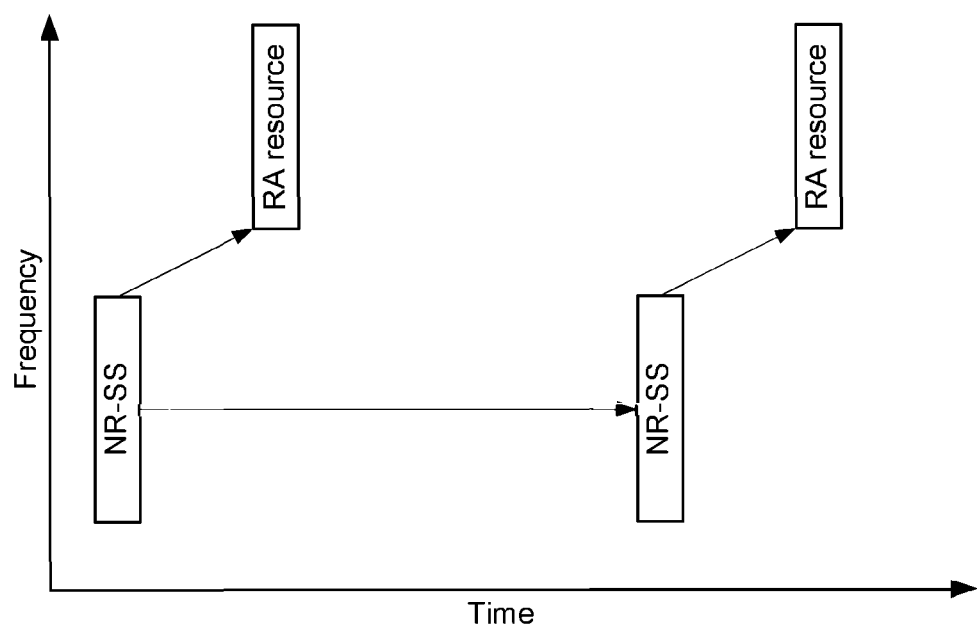
FIG. 4 is a diagram illustrating a random access resource associated to a NR-SS.
Figure 5:
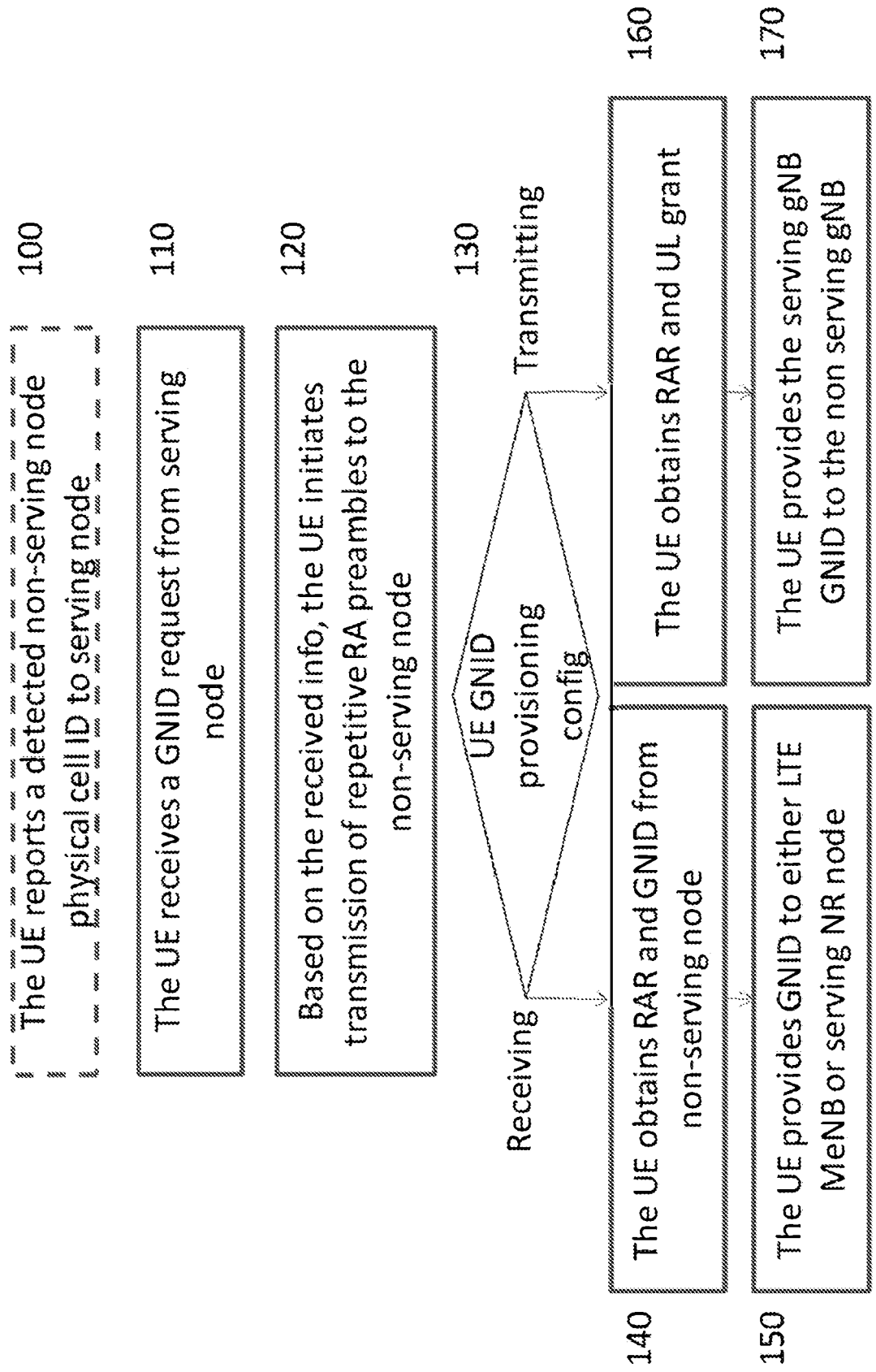
FIG. 5 is a flow chart illustrating UE operations according to some embodiments of inventive concepts.

From a UE perspective, operations of inventive concepts are illustrated by FIG. 5, where the UE optionally reports a Physical Cell Identity PCI of a non-serving cell to its serving node (100). In response, the UE obtains a GNID request (110) from the serving node (the serving node here could be either the serving NR gNB node or the LTE MeNB node). The UE initiates repetitive random access transmissions to the non-serving node (120). In case (130) the UE has been configured for a UE GNID receiving provisioning, the UE obtains a random access response and GNID from the non-serving node (140), and provides GNID to the serving node (150). If instead the UE is configured for a UE GNID transmission provisioning, the UE obtains RAR and an UL grant at the non-serving node (160). The UE uses to UL grant to provide the serving node GNIS to the non-serving node (170).

Figure 9:
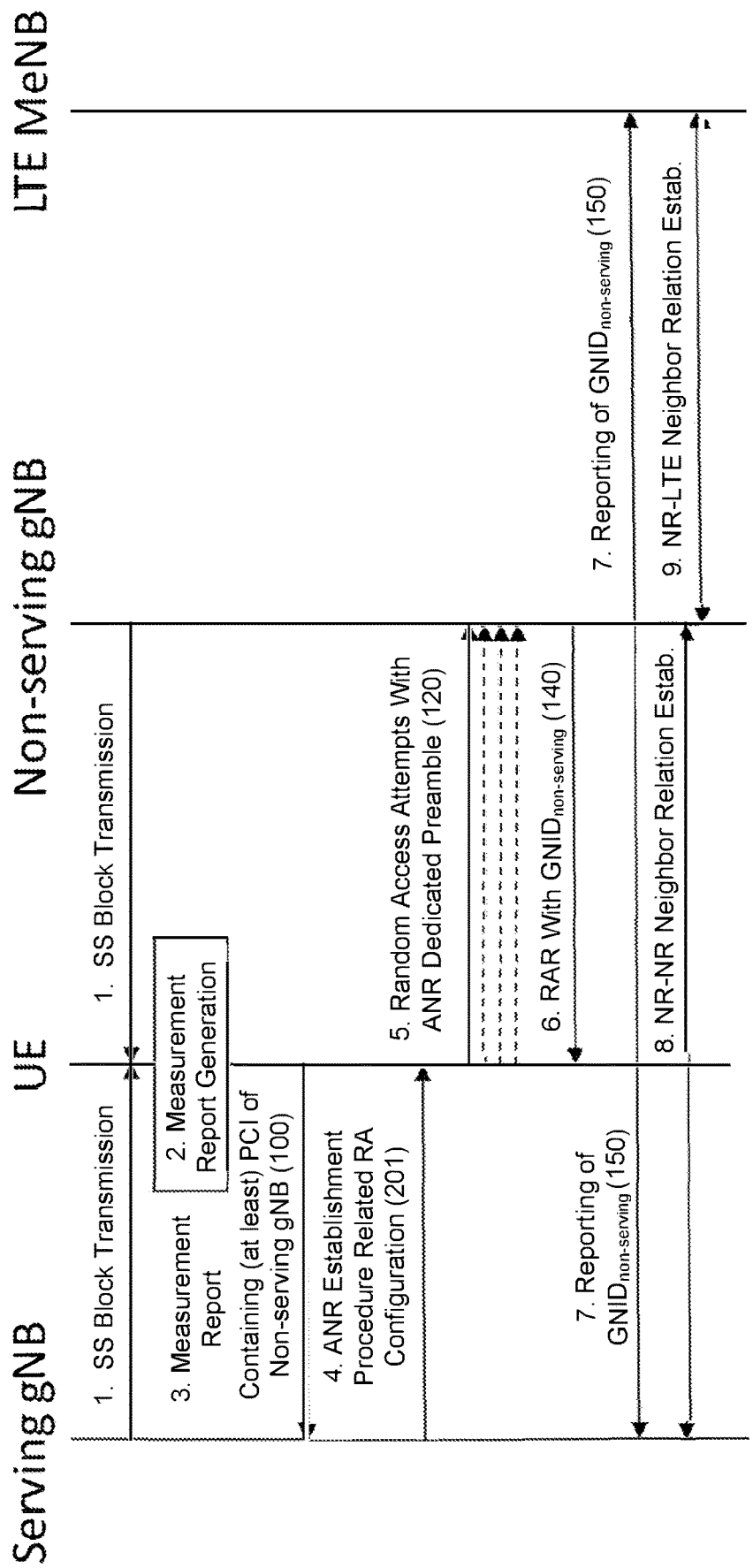
FIG. 9 is a message diagram illustrating operations according to some embodiments of inventive concepts.

A signal flow graph exemplifying some embodiments of inventive concepts is shown in FIG. 9. In FIG. 9, the UE performs multiple RA transmissions, receives RAR containing GNID of the non-serving gNB, and reports the same to both serving gNB and the LTE MeNB. Some embodiments of inventive concepts may result in aiding the neighbor relation establishment between serving gNB and non-serving gNB and also between LTE MeNB and non-serving gNB. At operation 1 of FIG. 9, the UE may receive respective SS block transmissions from serving and non-serving gNBs, and at operation 2 of FIG. 9, the UE may generate a measurement report. At operation 3 of FIG. 9, the UE may transmit a measurement report including at least a PCI of the non-serving gNB as discussed above with respect to operation 100 of FIG. 5. At operation 4 of FIG. 9, the serving gNB may initiate an ANR establishment procedure related RA configuration including transmitting a request to the UE including a repetitive RA preamble configuration as discussed above with respect to operation 210 of FIG. 7. At operation 5 of FIG. 9, the UE may perform random access attempts with the ANR dedicated preamble of operation 4 including transmission of repetitive RA preambles to the non-serving gNB as discussed above with respect to operation 120 of FIG. 5. At operation 6 of FIG. 9, the non-serving gNB may transmit an RAR with a GNID for the non-serving gNB to the UE as discussed above with respect to operation 140 of FIG. 5. At operation 7 of FIG. 9, the UE may report the GNID of the non-serving gNB to the serving gNB and/or to the LTE MeNB as discussed above with respect to operation 150 of FIG. 5. At operation 8 of FIG. 9, the UE may perform NR-NR neighbor establishment with respect to serving gNB and/or non-serving gNB, and/or at operation 9 of FIG. 9, NR-LTE neighbor relation establishment may be performed between non-serving gNB and LTE MeNB.

According to some embodiments of inventive concepts:

1. ANR may be supported in NR non-standalone mode where NR nodes only provides very limited system information;
2. ANR comes with an overhead that is activated only when a neighbor relation needs to be established;
3. UL based ANR may be supported also with different random access resource configurations in different nodes; and/or
4. UL based ANR may be supported in beam based systems Repetitive random access may be used.

The random access configuration includes two main parts—the random access preamble configuration and the random access resource configuration. Some parts of the random access configuration can be the same in a region or group of nodes, possibly in the entire network. Parts that can be common includes:

Random access preambles, like a set of golden preambles that all nodes in the region will monitor. One example is with preambles that are generated partly based on the PCI of the node. That means that the RA preamble configuration structure can be system wide, but where the actual preambles depend on PCI to make them locally unique. In case of a golden preamble, the non-serving node can also be made aware that the RA is of a specific kind, for example for the purpose of neighbor relations. In case of the preambles generated based on PCI, it is possible to use the same RA as used for other purposes.

Random access resources, which are defined in relation to an NR-SS. One example is presented in FIG. 6, where two different nodes have two different SS block periodicities and/or different RA resource offsets and/or RA resource periodicities within the RA resource. In this case, there is a least common divisor for the SS block periodicity and/or RA resource time offsets and/or RA resource periodicities. This is possible if the RA resources for repetitive random access are all in the same frequency band. The same thing holds for the RA response.

The serving gNB (or LTE MeNB) configuring UE for repetitive random access comprises An RA preamble, optionally as a function of PCI (in case the RA preamble is generated based on PCI, then the UE does not need to obtain any further configuration information except the non-serving node PCI which the UE can retrieve from the non-serving node transmissions)

A RA resource frequency offset in relation to NR SS

A starting RA resource time offset in relation to NR SS

A RA resource period or pattern in time for repetitive RA preamble transmissions A restriction in number of RA preambles to transmit or number of RA resources utilized or the total time of repetitive RA preamble transmissions The UE will start transmitting RA preambles in the repetitive RA resources defined by the configured parameters. The UE may stop transmitting the RA preambles after receiving a RA response. The UE may also continue to transmit RA preambles until the configured number or time window has been reached.

Figure 6:
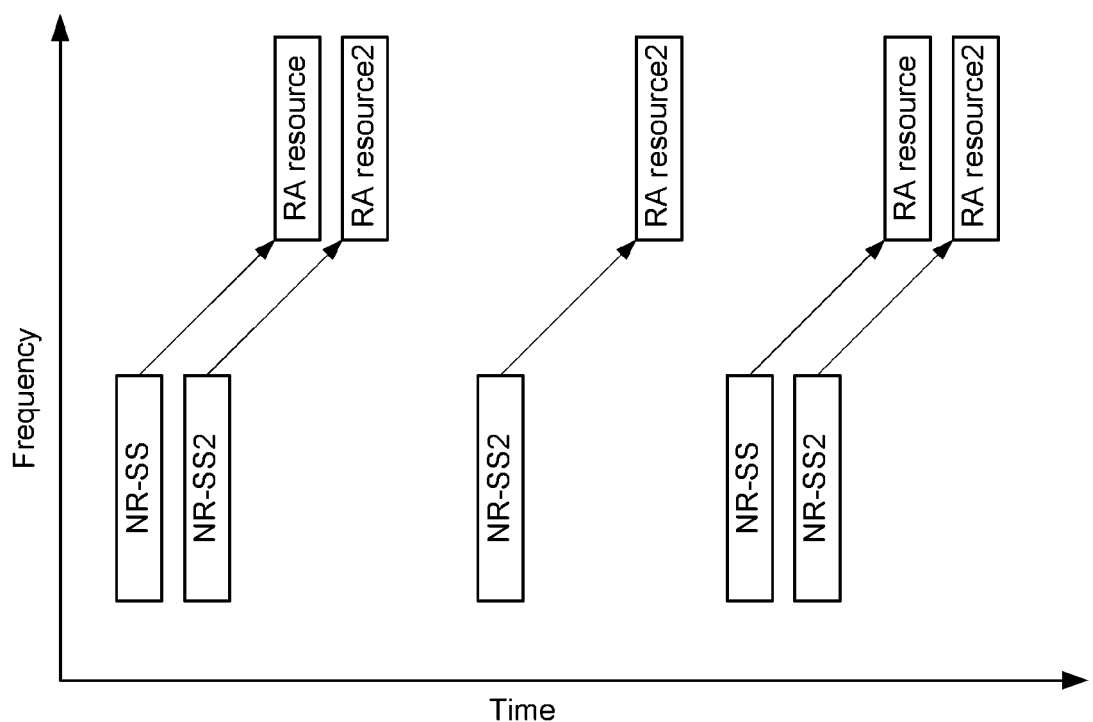
FIG. 6 is a diagram illustrating random access resource periodicity according to some embodiments of inventive concepts.

In association to FIG. 6, the repetitive RA preamble transmission will mean that for some non-serving nodes, the UE will transmit RA preambles much more often compared to the number of RA resources configured for the specific node. That may create unnecessary interference, which is considered tolerable since the neighbor relation establishment is very infrequent in the system and only needed once for each potential relation.

RA response and GNID provisioning will now be discussed.

The nature of the RA response to repetitive RA preamble transmissions may depend on the preamble. In case a golden preamble is used, the non-serving node is informed about the purpose of the RA (GNID provisioning), which means that the GNID could be encoded in the RA response. This will make the repetitive RA procedure very compact and brief. In this embodiment, the RAR could be multiplexed with the E-CGI on a MAC level.

If instead, the RA preamble is defined based on PCI and is the same as the regular RA preambles of the non-serving cell, then the UE needs to inform about the cause of the RA in the Msg 3 to the non-serving node, and the GNID can be provided in Msg 4 or in subsequent signaling.

In case the GNID provisioning is instead based on GNID transmission, the UE will provide the serving node GNID (can be both the NR gNB GNID as well as the LTE MeNB ECGI) to the non-serving node, either in Msg 3, or in subsequent signaling.

GNID reporting will now be discussed, and the GNID provisioning can be via either UE transmission or reception.

Figure 7:
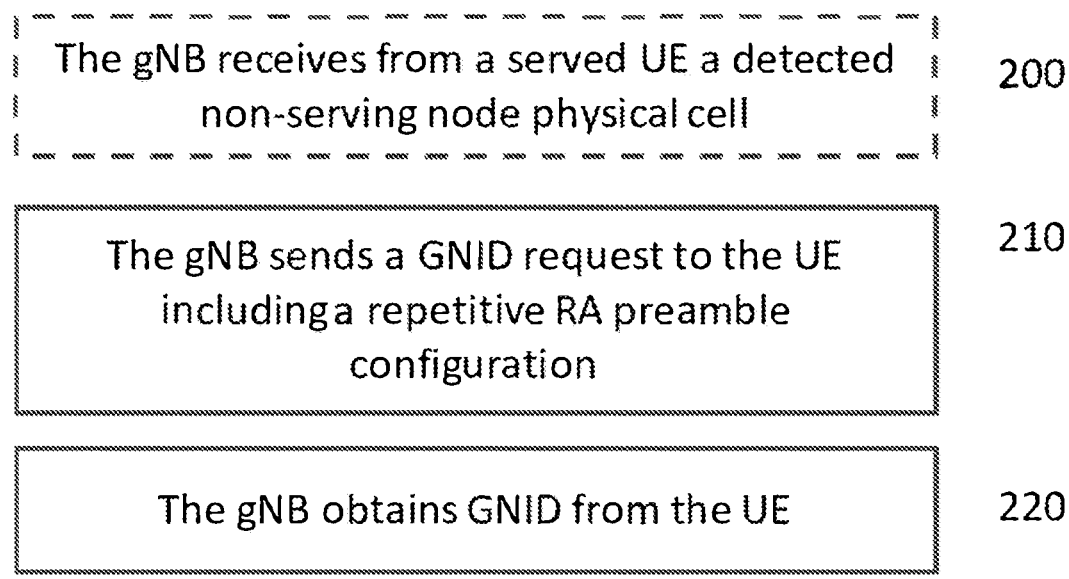
FIG. 7 is a flow chart illustrating operations from a serving node perspective with UE GNID provisioning based on GNID reception from a non-serving gNB according to some embodiments of inventive concepts.

The serving node perspective in case of UE reception for GNID provisioning is illustrated by FIG. 7. The serving node optionally receives from the served UE a PCI of a non-serving cell (200). The serving node sends (210) a repetitive RA configuration to the UE. When the UE has obtained the GNID of the non-serving node, the UE reports the GNID to the serving node (220). In one embodiment, the serving node is the LTE MeNB. In another embodiment, the serving node is the serving gNB. In yet another embodiment, the UE reports the GNID of the non-serving gNB to both LTE MeNB and also the serving gNB.

Figure 8:
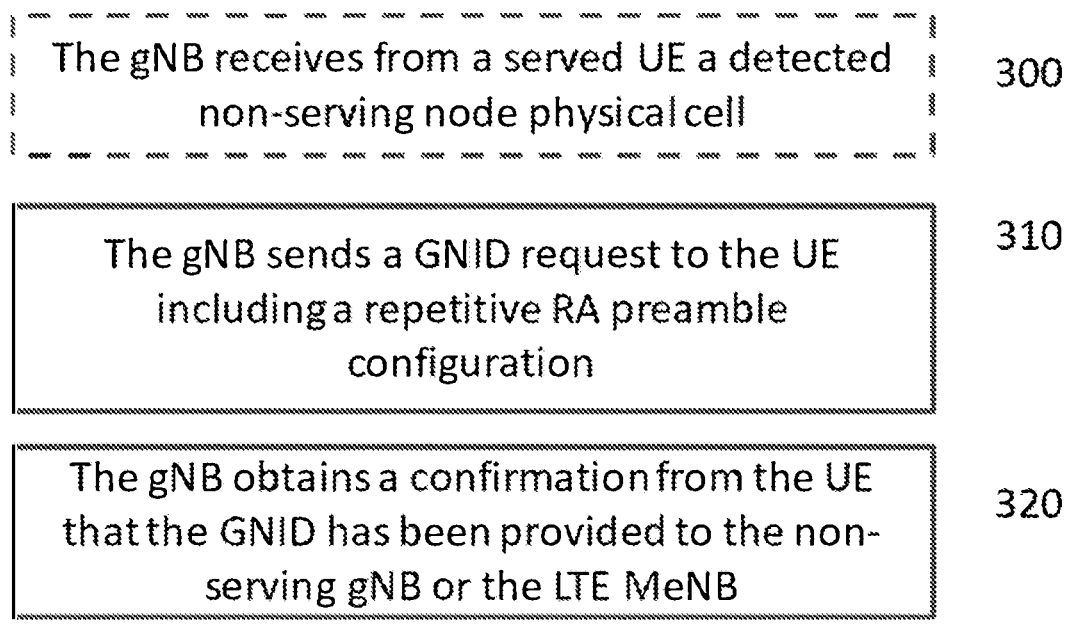
FIG. 8 is a flow chart illustrating operations from a serving node perspective with UE GNID provisioning based on GNID transmission to non-serving gNB or LTE MeNB according to some embodiments of inventive concepts.

The serving node perspective in case of UE transmission for GNID provisioning is illustrated by FIG. 8. The serving node optionally receives from the served UE a PCI of a non-serving cell (300). The serving node sends (310) a repetitive RA configuration to the UE. Optionally, the configuration contains the ECGI of the serving LTE MeNB and/or the GNID of the NR gNB. Alternatively, the UE retrieves the serving LTE MeNB ECGI via system information.

When the UE has transmitted the serving node GNID to the non-serving node, the UE optionally confirms to the serving node the provision of GNID (320).

Based on the obtained GNID of the NR gNBs, there can be neighbor relation establishments carried out both between the NR serving gNB and NR non-serving gNB and also between NR non-serving gNB and LTE MeNB.

The mentioned neighbor relations could be established in multitude of ways. Some of those methods are shown in the signal flow graphs of FIG. 10, FIG. 11 and FIG. 12. Note that, in all of these embodiments the neighbor relation establishment between serving gNB and non-serving gNB is considered. However, similar embodiments are applicable to the neighbor relation establishment between non-serving gNB and LTE MeNB.

Figure 10:
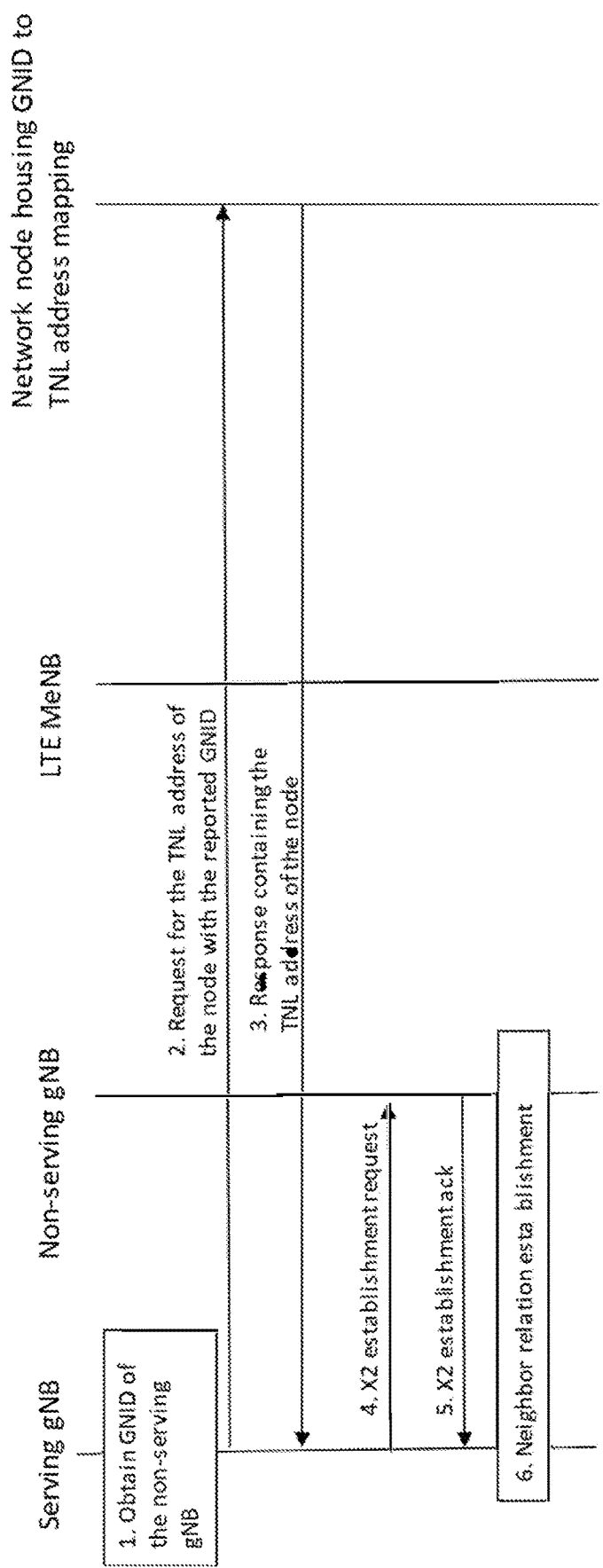
FIG. 10 is a message diagram illustrating a neighbor relation establishment procedure according to some embodiments of inventive concepts.

In FIG. 10, the serving gNB will initiate the process of neighbor relation establishment with non-serving gNB by contacting the network node housing the TNL-address mappings to the GNIDs. In this embodiment the serving gNB requests for the TNL address of the non-serving gNB. At operation 1 of FIG. 10, the serving gNB may obtain the GNID of the non-serving gNB. At operation 2 of FIG. 10, the serving gNB may transmit a request for the TNL address of the node with the reported GNID to a network node housing GNID to TNL address mapping. At operation 3 of FIG. 10, the serving gNB may receive a response containing the TNL address of the node. At operation 4 of FIG. 10, the serving gNB may transmit an X2 establishment request to the non-serving gNB, and at operation 5 of FIG. 10, the non-serving gNB may transmit an X2 establishment acknowledgement to the serving gNB. At operation 6 of FIG. 10, the serving and non-serving gNBs may provide neighbor relation establishment.

Figure 11:
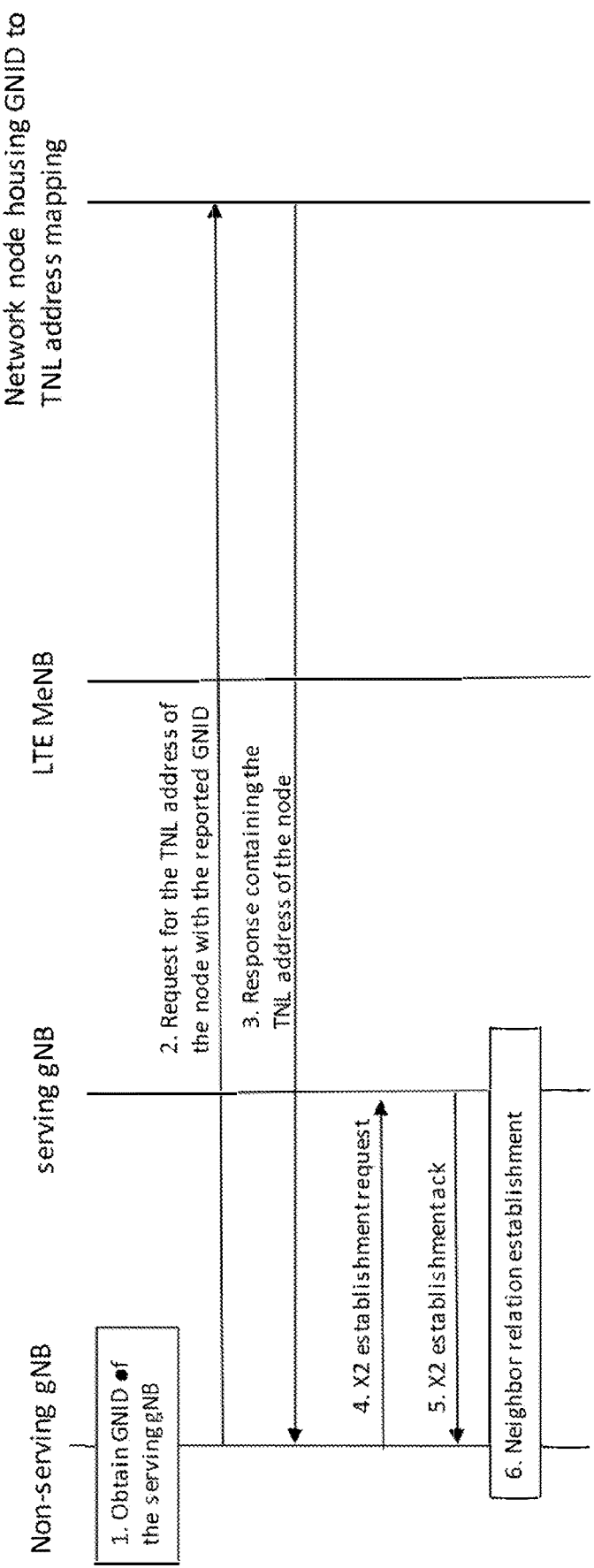
FIG. 11 is a message diagram illustrating a neighbor relation establishment procedure according to some embodiments of inventive concepts.

In FIG. 11, the non-serving gNB will initiate the process of neighbor relation establishment with serving gNB by contacting the network node housing the TNL-address mappings to the GNIDs. In this embodiment the non-serving gNB requests for the TNL address of the serving gNB. At operation 1 of FIG. 11, the non-serving gNB may obtain the GNID of the serving gNB. At operation 2 of FIG. 11, the non-serving gNB may transmit a request for the TNL address of the node with the reported GNID to a network node housing GNID to TNL address mapping. At operation 3 of FIG. 11, the non-serving gNB may receive a response containing the TNL address of the node. At operation 4 of FIG. 11, the non-serving gNB may transmit an X2 establishment request to the serving gNB, and at operation 5 of FIG. 11, the serving gNB may transmit an X2 establishment acknowledgement to the non-serving gNB. At operation 6 of FIG. 11, the non-serving and serving gNBs may provide neighbor relation establishment.

Figure 12:
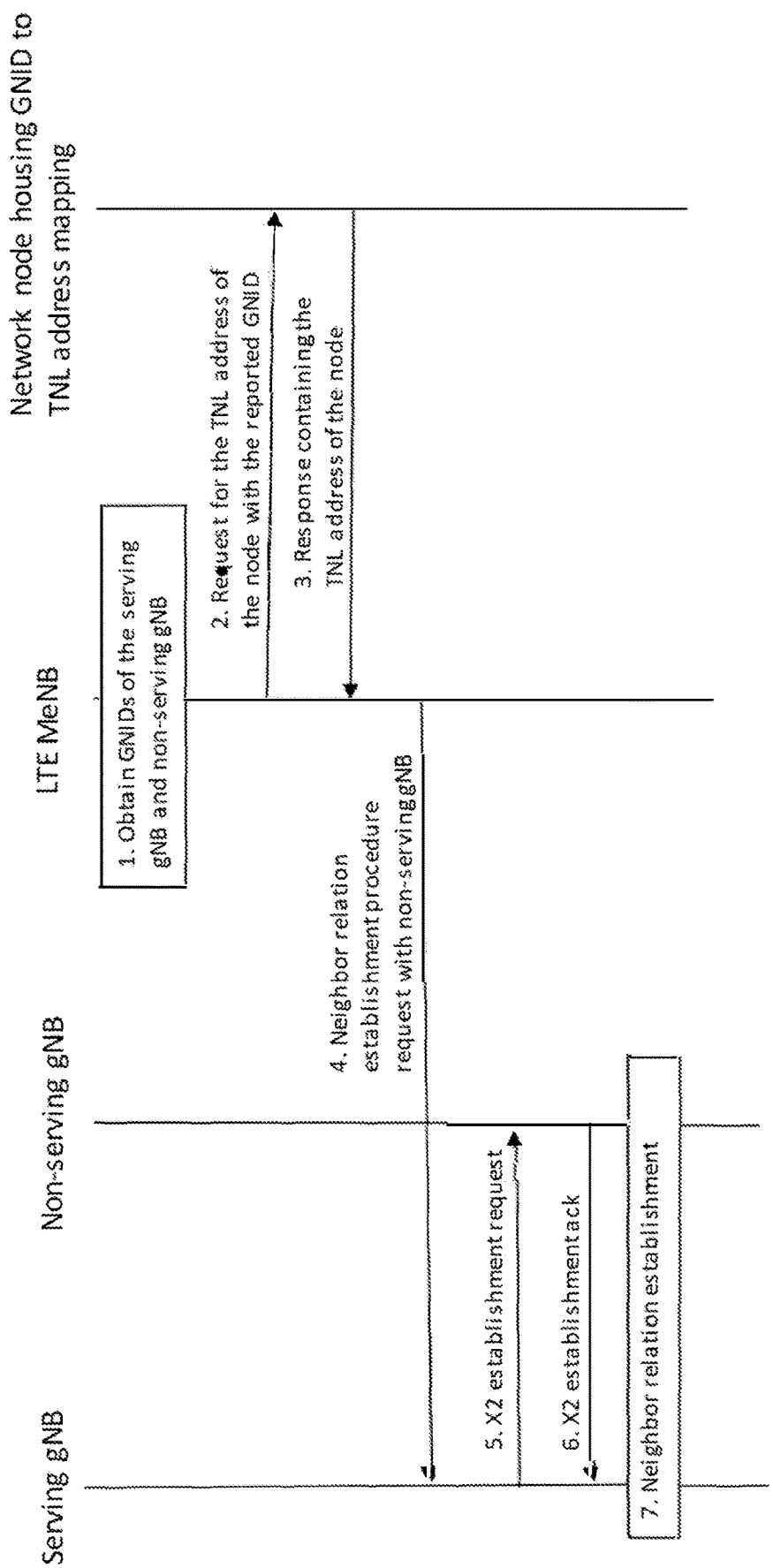
FIG. 12 is a message diagram illustrating a neighbor relation establishment procedure according to some embodiments of inventive concepts.

In FIG. 12, the LTE MeNB initiates the procedure for neighbor relation establishment between serving gNB and non-serving gNB. The LTE MeNB will aid the process of neighbor relation establishment between serving gNB and non-serving gNB by contacting the network node housing the TNL-address mappings to the GNIDs. In this embodiment the LTE MeNB requests for the TNL address of the non-serving gNB and forwards the response to the serving gNB. At operation 1 of FIG. 12, the LTE MeNB may obtain GNIDs of the serving gNB and the non-serving gNB. At operation 2 of FIG. 12, the LTE MeNB may transmit a request for the TNL address of the node with the reported GNID to a network node housing GNID to TNL address mapping. At operation 3 of FIG. 12, the LTE MeNB may receive a response containing the TNL address of the node. At operation 4 of FIG. 12, the LTE MeNB may transmit (to serving gNB) a neighbor relation establishment procedure request with non-serving gNB. At operation 5 of FIG. 12, the serving gNB may transmit an X2 establishment request to the non-serving gNB, and at operation 6 of FIG. 12, the non-serving gNB may transmit an X2 establishment acknowledgement to the serving gNB. At operation 7 of FIG. 12, the serving and non-serving gNBs may provide neighbor relation establishment.

The UE is configured to measure on NR carrier frequencies which are Non-Standalone carriers (i.e. do not transmit system information, at least not the complete set required for a UE to access the cell without assistance of a dedicated connection), detect NR cells, trigger IRAT mobility events (such as the equivalent to B1 and B2 in LTE) and send IRAT measurement reports, to assist the network to setup dual connectivity with a Non-Standalone (NSA) NR carrier based on measurements. After that configuration (LTE RRC measurement configuration over RRC), upon detecting a neighbor NR cell (e.g. via a physical cell identifier encoded in synchronization sequence(s)) and measuring that NR cell, mobility events can be trigger and measurement reports transmitted to the serving cell (via RRC signaling). Upon receiving the LTE measurement report the network may or may not recognize that PCI as a neighbor NR cell. If the network does not recognize the reported PCI as a neighbor NR cell the UE can be configured with a dedicated RRC message over LTE that may contain at least a serving cell LTE Global Cell Identifier (the UE may obtain that identifier over broadcasted system information of the serving LTE cell). Hence, upon receiving that message the UE should access the target NR cell using a RACH configuration that is known by NR target cells. Hence, the UE transmits the preamble and expects a RAR from the target cell. The target NR cell, upon receiving the preamble, recognizes that this is related to an ANR procedure i.e. there is an incoming UE that is connected to a Master eNB whose serving PCell does not have a neighbor relation with the gNB associated to the target NR cell. Hence, the NR cell knows that an automatic neighbor relation (ANR) establishment should occur before the establishment of Dual Connectivity between that MeNB/LTE and gNB/NR. Once the gNB detects that preamble, the NR target gNB transmits the RAR.

In a first option, the target NR gNB multiplexes in a MAC level with the RAR a NR Global Cell ID of the target. Upon receiving the RAR the UE knows the NR Global cell ID and reports that via RRC signaling to the serving LTE cell. After receiving that message, the LTE eNB can trigger a neighbor relation establishment with the reported NR cell gNB. After that, DC can be established with the NR gNB which becomes a SeNB such as by the MeNB sending an RRC Connection Re-configuration to the UE enabling the UE to access the target NR cell.

In a second option, the target NR sends the RAR and an UL grant for an NR Message 3. The UE then reports the LTE Global Cell ID of the serving cell to the NR target cell. After receiving that message, the LTE eNB can trigger a neighbor relation establishment with the reported NR cell gNB. After that, DC can be established with the NR gNB which becomes a SeNB.

Notice that the assumption is that in any of these options the target NR cell gNB knows that a certain RACH configuration is related to an unknown LTE neighbor cell that wants to establish dual connectivity. There could be different ways to define how the NR target cell gNB is aware of that RACH configuration. In one example, that is coded in the standards for that particular purpose i.e. to be used for NSA carriers when UEs are trying to establish DC from a serving cell (standalone carrier e.g. LTE as a Master eNB) that is not a neighbor of that target cell. In another example the OAM system configures a common RACH resource for NR NSA carriers (same per carrier or even the same for the whole system).

According to some embodiments of inventive concepts, GNID provisioning mechanisms are proposed based on a repetitive random access for universal triggering of a random access from a general neighbor non-serving node.

The repetitive RA procedure is designed to be able to trigger a RA response from a general non-serving node despite some node specific configurations of the RA preamble and/or RA resource in relation to the NR SS of the node.

Operations of a wireless terminal UE (e.g., the wireless terminal of FIG. 13) will now be discussed with reference to the flow chart of FIG. 15 according to some embodiments of inventive concepts. For example, modules may be stored in memory 1305 of FIG. 13, and these modules may provide instructions so that when the instructions of a module are executed by processor 1303, processor 1303 performs respective operations of the flow chart of FIG. 15.

At block 1501, processor 1303 may transmit a measurement report through transceiver 1307 to a serving base station for the wireless terminal UE, and the measurement report may include a secondary identification of the non-serving base station.

Responsive to receiving a request for a primary identification of a non-serving base station for the wireless terminal at block 1503, processor 1303 may initiate transmission through transceiver 1301 to the non-serving base station for the wireless terminal using a random access channel RACH configuration at block 1505. For example, initiating transmission using the random access channel RACH configuration may include initiating transmission of a plurality of repetitive random access preambles. Moreover, the request for the primary identification may be responsive to the measurement report.

At block 1507, processor 1303 may receive a random access response RAR from the non-serving base station through transceiver 1301. More particularly, the random access response may be received with the primary identification of the non-serving base station, and the random access response may be responsive to the transmission using the RACH configuration. If the transmission using the random access channel RACH configuration includes a plurality of repetitive random access preambles, the random access response may be responsive to at least one of the plurality of repetitive random access preambles.

At block 1509, processor 1303 may transmit the primary identification of the non-serving base station through transceiver 1301 to a node of the wireless communication network other than the non-serving base station.

According to some embodiments, the non-serving base station may be a target base station for dual connectivity communication, and at block 1511, processor 1303 may provide dual connectivity communication through transceiver 1301 and through the target and serving base stations after transmitting the primary identification.

According to some embodiments, the request for the primary identification may be received at block 1503 from the serving base station. According to some other embodiments, the request for the primary identification may be received at block 1503 from a master base station providing a coverage area covering the serving and non-serving base stations for the wireless terminal.

The secondary identification of the non-serving base station may be a physical cell identification of the non-serving base station. According to some embodiments, transmitting the primary identification at block 1509 may include transmitting the primary identification to the serving base station. According to some other embodiments, transmitting the primary identification may include transmitting the primary identification to another base station different than the serving base station and different than the non-serving base station. For example, the serving and non-serving base stations may be next generation base stations gNBs and the another base station may be a Long Term Evolution LTE Master base station LTE MeNB.

The primary identification of the non-serving base station may be a Global Node Identification GNID of the non-serving base station. The RACH configuration may be related to an unknown neighbor base station for dual connectivity. The non-serving base station may operate using a non-standalone carrier.

Various operations of FIG. 15 may be optional with respect to some embodiments. For example, operations of blocks 1501, 1503, and 1511 of FIG. 15 may be optional.

Operations of a wireless terminal UE (e.g., the wireless terminal of FIG. 13) will now be discussed with reference to the flow chart of FIG. 16 according to some embodiments of inventive concepts. For example, modules may be stored in memory 1305 of FIG. 13, and these modules may provide instructions so that when the instructions of a module are executed by processor 1303, processor 1303 performs respective operations of the flow chart of FIG. 16.

At block 1601, processor 1301 may transmit a measurement report through transceiver 1301 to a serving base station for the wireless terminal, and the measurement report may include a secondary identification of the non-serving base station, and the request for the primary identification may be responsive to the measurement report.

Responsive to receiving a request for a primary identification of a non-serving base station for the wireless terminal at block 1603, processor 1303 may initiate transmission through transceiver 1301 to the non-serving base station for the wireless terminal using a random access channel RACH configuration at block 1605. For example, initiating transmission using the random access channel RACH configuration may include initiating transmission of a plurality of repetitive random access preambles, and the random access response of block 1607 may be responsive to at least one of the plurality of repetitive random access preambles.

At block 1607, processor 1303 may receive a random access response RAR with an uplink grant from the non-serving base station through transceiver 1301, and the random access response may be responsive to the transmission using the RACH configuration. At block 1609, processor 1303 may transmit a primary identification of a serving base station for the wireless terminal to the non-serving base station through transceiver 1301 using the uplink grant.

According to some embodiments, the non-serving base station may be a target base station for dual connectivity communication, and processor 1303 may provide dual connectivity communication through transceiver 1301 and through the target and serving base stations at block 1611 after transmitting the primary identification.

According to some embodiments, the request for the primary identification may be received from the serving base station. According to some other embodiments, the request for the primary identification may be received from a master base station providing a coverage area covering the serving and non-serving base stations for the wireless terminal.

The secondary identification of the non-serving base station may be a physical cell identification of the non-serving base station. The primary identification of the serving base station may be a Global Node IDentification GNID of the serving base station. The RACH configuration may be related to an unknown neighbor base station for dual connectivity. Moreover, the non-serving base station may operate using a non-standalone carrier.

Various operations of FIG. 16 may be optional with respect to some embodiments. For example, operations of blocks 1601, 1603, and 1611 of FIG. 16 may be optional.

Operations of a base station (e.g., the network node of FIG. 14) will now be discussed with reference to the flow chart of FIG. 17 according to some embodiments of inventive concepts where the base station acts as a serving base station for a wireless terminal. For example, modules may be stored in memory 1405 of FIG. 14, and these modules may provide instructions so that when the instructions of a module are executed by processor 1403, processor 1403 performs respective operations of the flow chart of FIG. 17.

At block 1701, processor 1403 may receive a measurement report from a wireless terminal through transceiver 1401, and the measurement report may include a secondary identification of a non-serving base station. At block 1703, processor 1403 may transmit a request through transceiver 1401 to the wireless terminal for a primary identification of the non-serving base station responsive to the measurement report.

At block 1705, processor 1403 may receive the primary identification of the non-serving base station from the wireless terminal through transceiver 1401 after transmitting the request. At block 1707, processor 1403 may trigger establishment of neighbor relations with the non-serving base station through network interface 1407 responsive to receiving the primary identification for the non-serving base station.

According to some embodiments, the non-serving base station may be a target base station for dual connectivity communication, and processor 1403 may provide dual connectivity communication with the wireless terminal through the serving base station in cooperation with the target base station after receiving the primary identification and after triggering establishment of neighbor relations.

The secondary identification of the non-serving base station may be a physical cell identification of the non-serving base station. The primary identification of the non-serving base station may be a Global Node IDentification GNID of the non-serving base station. The non-serving base station may operate using a non-standalone carrier.

According to some embodiments, the serving base station may be a Long Term Evolution LTE base station LTE eNB, and the non-serving base station may be a next generation base station gNB. According to some other embodiments, the serving and non-serving base stations may be next generation base stations gNBs.

Transmitting the request for the primary identification of the non-serving base station at block 1703 may include transmitting the request responsive to determining that there is no neighbor relation for the non-serving base station based on the secondary identification for the non-serving base station.

Various operations of FIG. 17 may be optional with respect to some embodiments. For example, operations of blocks 1707 and 1709 of FIG. 17 may be optional.

Operations of a base station (e.g., the network node of FIG. 14) will now be discussed with reference to the flow chart of FIG. 18 according to some embodiments of inventive concepts where the base station is a non-serving base station with respect to a wireless terminal. For example, modules may be stored in memory 1405 of FIG. 14, and these modules may provide instructions so that when the instructions of a module are executed by processor 1403, processor 1403 performs respective operations of the flow chart of FIG. 18.

At block 1801, processor 1403 may receive a random access channel RACH configuration from a wireless terminal through transceiver 1401. At block 1803, processor 1403 may transmit a random access response RAR with an uplink grant to the wireless terminal through transceiver 1401 responsive to receiving the RACH configuration from the wireless terminal. For example, transmitting the RAR may include transmitting the RAR responsive to recognizing that the RACH configuration is related to an unknown neighbor base station for dual connectivity. At block 1805, processor 1403 may receive a primary identification of a serving base station from the wireless terminal through transceiver 1401 using the uplink grant.

At block 1807, processor 1403 may trigger establishment of neighbor relations with the serving base station through network interface 1407 responsive to receiving the primary identification for the serving base station. For example, triggering establishment may include triggering establishment responsive to determining that there is no neighbor relation for the serving base station based on the primary identification for the serving base station.

According to some embodiments, the non-serving base station may be a target base station for dual connectivity communication, and processor 1403 may provide dual connectivity communication with the wireless terminal through the target and serving base stations at block 1809 after receiving the primary identification and after triggering establishment of neighbor relations.

The primary identification of the serving base station may be a Global Node IDentification GNID of the serving base station. The RACH configuration may be a random access preamble. The serving base station may be a Long Term Evolution LTE base station (LTE eNB), and the non-serving base station may be a next generation base station (gNB). The serving and non-serving base stations may be next generation base stations (gNBs). The non-serving base station may operate using a non-standalone carrier.

Various operations of FIG. 18 may be optional with respect to some embodiments. For example, operations of blocks 1807 and 1809 of FIG. 18 may be optional.

Example embodiments according to some embodiments of inventive concepts are discussed below.

1. A method of operating a wireless terminal (UE) in a wireless communication network, the method comprising: responsive to receiving a request for a primary identification of a non-serving base station for the wireless terminal, initiating transmission to the non-serving base station for the wireless terminal using a random access channel, RACH, configuration; receiving a random access response, RAR, from the non-serving base station, wherein the random access response is received with the primary identification of the non-serving base station, and wherein the random access response is responsive to the transmission using the RACH configuration; and transmitting the primary identification of the non-serving base station to a node of the wireless communication network other than the non-serving base station.

2. The method of Embodiment 1 further comprising: transmitting a measurement report to a serving base station for the wireless terminal, wherein the measurement report includes a secondary identification of the non-serving base station, and wherein the request for the primary identification is responsive to the measurement report.

3. The method of Embodiment 2, wherein the request for the primary identification is received from the serving base station.

4. The method of Embodiment 2, wherein the request for the primary identification is received from a master base station providing a coverage area covering the serving and non-serving base stations for the wireless terminal.

5. The method of any of Embodiments 2-4 wherein the secondary identification of the non-serving base station is a physical cell identification of the non-serving base station.

6. The method of any of Embodiments 1-5, wherein transmitting the primary identification comprises transmitting the primary identification to the serving base station.

7. The method of any of Embodiments 1-5, wherein transmitting the primary identification comprises transmitting the primary identification to another base station different than the serving base station and different than the non-serving base station.

8. The method of Embodiment 7 wherein the serving and non-serving base stations comprise next generation base stations (gNBs) and the another base station comprises a Long Term Evolution, LTE, Master base station (LTE MeNB).

9. The method of any of Embodiments 1-8 wherein the primary identification of the non-serving base station is a Global Node IDentification, GNID, of the non-serving base station.

10. The method of any of Embodiments 1-9 wherein initiating transmission using the random access channel, RACH, configuration to the non-serving base station for the wireless terminal comprises initiating transmission of a plurality of repetitive random access preambles, and wherein the random access response is responsive to at least one of the plurality of repetitive random access preambles.

11. A method of operating a wireless terminal (UE) in a wireless communication network, the method comprising: responsive to receiving a request for a primary identification of a non-serving base station for the wireless terminal, initiating transmission to the non-serving base station for the wireless terminal using a random access channel, RACH, configuration; receiving a random access response, RAR, with an uplink grant from the non-serving base station, wherein the random access response is responsive to the transmission using the RACH configuration; and transmitting a primary identification of a serving base station for the wireless terminal to the non-serving base station using the uplink grant.

12. The method of Embodiment 11 further comprising: transmitting a measurement report to the serving base station for the wireless terminal, wherein the measurement report includes a secondary identification of the non-serving base station, and wherein the request for the primary identification is responsive to the measurement report.

13. The method of Embodiment 12, wherein the request for the primary identification is received from the serving base station.

14. The method of Embodiment 12, wherein the request for the primary identification is received from a master base station providing a coverage area covering the serving and non-serving base stations for the wireless terminal.

15. The method of any of Embodiments 12-14 wherein the secondary identification of the non-serving base station is a physical cell identification of the non-serving base station.

16. The method of any of Embodiments 11-15 wherein the primary identification of the serving base station is a Global Node IDentification, GNID, of the serving base station.

17. The method of any of Embodiments 11-16 wherein initiating transmission using the random access channel, RACH, configuration to the non-serving base station for the wireless terminal comprises initiating transmission of a plurality of repetitive random access preambles, and wherein the random access response is responsive to at least one of the plurality of repetitive random access preambles.

18. The method of any of Embodiments 1-17 wherein the non-serving base station operates using a non-standalone carrier.

19. The method of any of Embodiments 1-18, wherein the non-serving base station is a target base station for dual connectivity communication, the method further comprising: after transmitting the primary identification, providing dual connectivity communication through the target and serving base stations.

20. A wireless terminal, UE, comprising: a transceiver configured to provide wireless communication in a wireless communication network; and a processor coupled with the transceiver, wherein the processor is configured to provide wireless network communication through the transceiver, wherein the processor is configured to perform operations according to any of Embodiments 1-19.

21. A wireless terminal, UE, wherein the wireless terminal is adapted to perform operations according to any of Embodiments 1-19.

22. A wireless terminal, UE, wherein the wireless terminal includes modules configured to perform operations according to any of Embodiments 1-19.

23. A method of operating a base station in a wireless communication network, wherein the base station acts as a serving base station for a wireless terminal, the method comprising: receiving a measurement report from a wireless terminal, wherein the measurement report includes a secondary identification of a non-serving base station; responsive to the measurement report, transmitting a request to the wireless terminal for a primary identification of the non-serving base station; and after transmitting the request, receiving the primary identification of the non-serving base station from the wireless terminal.

24. The method of Embodiment 23 wherein the secondary identification of the non-serving base station is a physical cell identification of the non-serving base station.

25. The method of any of Embodiments 23-24 wherein the primary identification of the non-serving base station is a Global Node IDentification, GNID, of the non-serving base station.

26. The method of any of Embodiments 23-25 wherein the serving base station comprises a Long Term Evolution, LTE, base station (LTE eNB), and the non-serving base station comprises a next generation base station (gNB).

27. The method of Embodiment 23-25 wherein the serving and non-serving base stations comprise next generation base stations (gNBs).

28. The method of any of Embodiments 23-27 wherein the non-serving base station operates using a non-standalone carrier.

29. The method of any of Embodiments 23-28, wherein the non-serving base station is a target base station for dual connectivity communication, the method further comprising: after receiving the primary identification, providing dual connectivity communication with the wireless terminal through the serving base station in cooperation with the target base station.

30. The method of Embodiment 29 further comprising: before providing dual connectivity communication, triggering establishment of neighbor relations with the non-serving base station responsive to receiving the primary identification for the non-serving base station.

31. The method of any of Embodiments 23-30 wherein transmitting the request for the primary identification of the non-serving base station comprises transmitting the request responsive to determining that there is no neighbor relation for the non-serving base station based on the secondary identification for the non-serving base station.

32. A method of operating a base station in a wireless communication network, wherein the base station is a non-serving base station with respect to a wireless terminal, the method comprising: receiving a random access channel, RACH, configuration from a wireless terminal; responsive to receiving the RACH configuration from the wireless terminal, transmitting a random access response, RAR, with an uplink grant to the wireless terminal; and receiving a primary identification of a serving base station from the wireless terminal using the uplink grant.

33. The method of Embodiment 32 wherein the primary identification of the serving base station is a Global Node IDentification, GNID, of the serving base station.

34. The method of any of Embodiments 32-33 wherein the RACH configuration comprises a random access preamble.

35. The method of any of Embodiments 32-34 wherein the serving base station comprises a Long Term Evolution, LTE, base station (LTE eNB), and the non-serving base station comprises a next generation base station (gNB).

36. The method of Embodiment 32-34 wherein the serving and non-serving base stations comprise next generation base stations (gNBs).

37. The method of any of Embodiments 32-36 wherein the non-serving base station operates using a non-standalone carrier.

38. The method of any of Embodiments 32-37, wherein the non-serving base station is a target base station for dual connectivity communication, the method further comprising:
after receiving the primary identification, providing dual connectivity communication with the wireless terminal through the target and serving base stations.

39. The method of Embodiment 38 further comprising:
before providing dual connectivity communication, triggering establishment of neighbor relations with the serving base station responsive to receiving the primary identification for the serving base station.

40. The method of Embodiment 39 wherein triggering establishment comprises triggering establishment responsive to determining that there is no neighbor relation for the serving base station based on the primary identification for the serving base station.

41. The method of any of Embodiments 32-40, wherein transmitting the RAR comprises transmitting the RAR responsive to recognizing that the RACH configuration is related to an unknown neighbor base station for dual connectivity.

42. A network node comprising: a transceiver configured to provide wireless network communication with a wireless terminal; a network interface configured to provide network communication with other network nodes; and a processor coupled with the transceiver and the network interface, wherein the processor is configured to provide communication with the wireless terminal through the transceiver, wherein the processor is configured to provide communication with the other network nodes through the network interface, and wherein the processor is configured to perform operations according to any of Embodiments 23-41.

43. A network node, wherein the network node is adapted to perform operations according to any of Embodiments 23-41.

44. A network node, wherein the network node includes modules configured to perform operations according to any of Embodiments 23-41.

45. A method of any of Embodiments 1-22 wherein the RACH configuration is related to an unknown neighbor base station for dual connectivity.

Abbreviation used in the present disclosure and their respective meanings are presented below.
ANR Automatic Neighbor Relation
ECGI Evolved Cell Global Identity
GNID Global Node ID
LTE Long Term Evolution
NR New Radio
SS Synch signal
PBCH Physical Broadcast channel
PSS Primary Synch Signal
SSS Secondary Synch Signals Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless terminal (UE) in a wireless communication network, the method comprising:
responsive to receiving a request for a primary identification of a non-serving base station for the wireless terminal, initiating transmission to the non-serving base station for the wireless terminal using a random access channel (RACH) configuration;
receiving a random access response (RAR) from the non-serving base station, wherein the random access response is received with the primary identification of the non-serving base station, and wherein the random access response is responsive to the transmission using the RACH configuration; and
transmitting the primary identification of the non-serving base station to a node of the wireless communication network other than the non-serving base station.

2. The method of claim 1, wherein initiating transmission using the RACH configuration to the non-serving base station for the wireless terminal comprises initiating transmission of a plurality of repetitive random access preambles, and wherein the random access response is responsive to at least one of the plurality of repetitive random access preambles.

3. The method of any of claim 1 further comprising:
transmitting a measurement report to a serving base station for the wireless terminal, wherein the measurement report includes a secondary identification of the non-serving base station, and wherein the request for the primary identification is responsive to the measurement report.

4. The method of claim 3, wherein the secondary identification of the non-serving base station is a physical cell identification of the non-serving base station.

5. The method of claim 1, wherein the primary identification of the non-serving base station is a Global Node IDentification (GNID) of the non-serving base station.

6. The method of claim 1, wherein the non-serving base station is a target base station for dual connectivity communication, the method further comprising:
after transmitting the primary identification, providing dual connectivity communication through the target and serving base stations.

7. A method of operating a wireless terminal (UE) in a wireless communication network, the method comprising:
responsive to receiving a request for a primary identification of a non-serving base station for the wireless terminal, initiating transmission to the non-serving base station for the wireless terminal using a random access channel (RACH) configuration;
receiving a random access response (RAR) with an uplink grant from the non-serving base station, wherein the random access response is responsive to the transmission using the RACH configuration; and transmitting a primary identification of a serving base station for the wireless terminal to the non-serving base station using the uplink grant.

8. The method of claim 7, wherein initiating transmission using the RACH configuration to the non-serving base station for the wireless terminal comprises initiating transmission of a plurality of repetitive random access preambles, and wherein the random access response is responsive to at least one of the plurality of repetitive random access preambles.

9. The method of claim 7 further comprising:
transmitting a measurement report to the serving base station for the wireless terminal, wherein the measurement report includes a secondary identification of the non-serving base station, and wherein the request for the primary identification is responsive to the measurement report.

10. The method of claim 9, wherein the secondary identification of the non-serving base station is a physical cell identification of the non-serving base station.

11. The method of claim 7, wherein the primary identification of the serving base station is a Global Node IDentification (GNID) of the serving base station.

12. The method of claim 7, wherein the non-serving base station is a target base station for dual connectivity communication, the method further comprising:
after transmitting the primary identification, providing dual connectivity communication through the target and serving base stations.

13. A wireless terminal (UE) comprising:
a transceiver configured to provide wireless communication in a wireless communication network; and
a processor coupled with the transceiver, wherein the processor is configured to provide wireless network communication through the transceiver, wherein the processor is further configured to,
initiate transmission through the transceiver to a non-serving base station for the wireless terminal using a random access channel (RACH) configuration responsive to receiving a request for a primary identification of a non-serving base station for the wireless terminal;
receive a random access response (RAR) from the non-serving base station through the transceiver, wherein the random access response is received with the primary identification of the non-serving base station, and wherein the random access response is responsive to the transmission using the RACH configuration; and
transmit the primary identification of the non-serving base station through the transceiver to a node of the wireless communication network other than the non-serving base station.

14. The wireless terminal of claim 13, wherein initiating transmission using the RACH configuration to the non-serving base station for the wireless terminal comprises initiating transmission of a plurality of repetitive random access preambles, and wherein the random access response is responsive to at least one of the plurality of repetitive random access preambles.

15. The wireless terminal of claim 13, wherein the processor is further configured to,
transmit a measurement report to a serving base station for the wireless terminal, wherein the measurement report includes a secondary identification of the non-serving base station, and wherein the request for the primary identification is responsive to the measurement report.

16. The wireless terminal of claim 13, wherein the non-serving base station is a target base station for dual connectivity communication, wherein the processor is further configured to,
provide dual connectivity communication through the target and serving base stations after transmitting the primary identification.

17. A wireless terminal (UE) comprising:
a transceiver configured to provide wireless communication in a wireless communication network; and
a processor coupled with the transceiver, wherein the processor is configured to provide wireless network communication through the transceiver, wherein the processor is further configured to,
initiate transmission through the transceiver to a non-serving base station for the wireless terminal using a random access channel (RACH) configuration responsive to receiving a request for a primary identification of a non-serving base station for the wireless terminal,
receive a random access response (RAR) with an uplink grant from the non-serving base station through the transceiver, wherein the random access response is responsive to the transmission using the RACH configuration, and
transmit a primary identification of a serving base station for the wireless terminal through the transceiver to the non-serving base station using the uplink grant.

18. The wireless terminal of claim 17, wherein initiating transmission using the RACH configuration to the non-serving base station for the wireless terminal comprises initiating transmission of a plurality of repetitive random access preambles, and wherein the random access response is responsive to at least one of the plurality of repetitive random access preambles.

19. The wireless terminal of claim 17, wherein the processor is further configured to,
transmit a measurement report through the transceiver to the serving base station for the wireless terminal, wherein the measurement report includes a secondary identification of the non-serving base station, and wherein the request for the primary identification is responsive to the measurement report.

20. The wireless terminal of claim 17, wherein the non-serving base station is a target base station for dual connectivity communication, wherein the processor is further configured to,
provide dual connectivity communication through the transceiver and the target and serving base stations after transmitting the primary identification.

* * * * *